United States Patent

Stahl et al.

[11] Patent Number: 6,010,588
[45] Date of Patent: Jan. 4, 2000

[54] POLYOLEFIN FIBERS AND THEIR FABRICS

[75] Inventors: Glenn Allan Stahl, Humble; James John McAlpin, Houston, both of Tex.

[73] Assignee: Exxon Chemical Patents Inc., Houston, Tex.

[21] Appl. No.: 08/385,401

[22] Filed: Feb. 7, 1995

Related U.S. Application Data

[63] Continuation of application No. 08/164,520, Dec. 9, 1993, abandoned, which is a continuation-in-part of application No. 08/066,737, May 25, 1993, abandoned.

[51] Int. Cl.$^7$ .................................................. D04H 3/16
[52] U.S. Cl. ....................... 156/167; 156/169; 156/166; 156/175; 156/180; 162/141; 57/252; 57/255; 57/289
[58] Field of Search ........................ 428/357, 224, 428/903, 288, 286, 364; 523/124; 525/387; 526/901, 126, 160; 156/167, 169, 180, 171, 175, 176, 166; 8/115.51, 115.54, 115.58; 162/141; 57/252, 255, 289; 502/103, 104, 108, 117

[56] References Cited

U.S. PATENT DOCUMENTS

| | | | |
|---|---|---|---|
| 4,340,563 | 7/1982 | Appel et al. | 264/518 |
| 4,430,852 | 2/1984 | Hatcher | 57/247 |
| 4,451,589 | 5/1984 | Morman et al. | 523/124 |
| 4,797,318 | 1/1989 | Brooker et al. | 428/283 |
| 4,818,597 | 4/1989 | Du Ponte et al. | 425/171 |
| 5,026,798 | 6/1991 | Canich | 526/127 |
| 5,078,935 | 1/1992 | Kobayshi et al. | 264/103 |
| 5,188,885 | 2/1993 | Timmons et al. | 428/198 |
| 5,213,881 | 5/1993 | Timmons et al. | 428/224 |
| 5,240,894 | 8/1993 | Burkhardt et al. | 502/108 |
| 5,637,666 | 6/1997 | Winter et al. | |

*Primary Examiner*—Merrick Dixon
*Attorney, Agent, or Firm*—C. Paige Schmidt

[57] ABSTRACT

Novel fibers have been made of reactor grade isotactic poly-alpha-olefin wherein polypropylene is produced by single-site catalysis and has a melt flow rate of greater than zero to about 5,000, MWD in the range of about 1.0 to about 3.5.

25 Claims, 1 Drawing Sheet

1700-097E
× PP-3445 CRed 35 mfr
◇ 083-001 22 mfr
✳ 072-002 40 mfr
Z 074-001 51 mfr

POLYOLEFIN FIBERS AND THEIR FABRICS

This is a continuation of application Ser. No. 08/164,520, filed Dec. 9, 1993, now abandoned, which is a continuation in part of application U.S. Ser. No. 08/066,737 filed May 25, 1993, now abandoned.

FIELD OF THE INVENTION

This invention relates to novel fibers made from reactor grades of isotactic polyolefins and fabrics of those fibers. These novel fibers and fabrics are made from isotactic polyolefins which are a reactor-grade polymer useful for fiber formation without being subjected to post-reactor treatment to lower molecular weight, or having been subjected to post-reactor treatment without substantial alteration of MWD of the polymer resin.

BACKGROUND OF THE INVENTION

Poly-alpha-olefins traditionally have been catalyzed by well-known multi-site catalysts including Ziegler-Natta type catalysts such as titanium chloride. While such catalysts are useful for producing resins or polymers of alpha-olefins, including polypropylene, they produce polymers with relatively broad molecular weight distributions or polydispersity which will include significant fractions of polymer material with both higher and lower molecular weight than the average or nominal molecular weight of the polyolefin polymer.

The high molecular weight fraction included in the traditionally catalyzed polymer is likely to cause processing difficulties for the maker of polypropylene fibrous or fiber-containing products. While not wishing to be bound by theory, it is believed that the high molecular weight species of polypropylene which are found in such reactor-grade polymers, will contribute significantly to the melt strength of the molten polypropylene catalyzed, thus diminishing the processibility of the polymer, particularly in the field of fiber manufacture. The high melt strength of multi-site or other traditionally produced molten polypropylene will generally form fibers by a melt spinning process but will yield comparatively large diameter fibers when run at economically practical production rates. Such fibers may feel stiff or coarse when compared with other fibers, particularly natural fibers or fibers of a smaller diameter or lower denier.

Conceptually, it is easy to visualize why it is desirable to reduce the concentration of high molecular weight polypropylene species within a particular nominal or average molecular weight production batch. When it is considered that the longer polymer chains tend to be conformationally more bulky, coiled, or otherwise entangled, it can be understood that it becomes more difficult to move those particular species within the polymer. The fact that these high molecular weight chains are longer contributes to the need for higher processing temperatures and the high strength of molten polypropylene. From a kinetic standpoint, it becomes more difficult to add sufficient energy to these molecules to move them. Once those higher molecular weight species become molten they generally become more prone to entanglement due to their size. It is the presence of this significant fraction of the higher molecular weight species which causes numerous problems in the high speed production of fibers, in the instance of melt spinning, in the case of, for example, melt blowing or spun bonding, and subsequent formation of quality fabrics.

Some of the problems which may be created or at least exacerbated by the high molecular weight fraction include the need for higher processing temperatures which are necessary to reduce inherent melt strength and viscosity and cause the higher molecular weight chains to move. This will require higher energy input to move the polymer, which contains high molecular weight species, through the extruder or other processing equipment. All of this leads not only to higher wear on materials handling equipment, including extruders, resulting from the higher energy input necessary, but also likely degradation of polymer and polymer product properties.

For fibers, commonly, non-homopolyethylene higher polyolefins having the significant fraction of high molecular weight species will process with some difficulty. As mentioned, also, in copending U.S. Ser. No. 08/066,737, from which this application derives priority as a continuation-in-part, aside from the general difficulties encountered in processing this material additional problems are encountered with fiber processing. These include difficulty in making fine fibers at practical production rates which derives from the difficulty in extending the molten polymer fibril. This is associated with high melt strength of molten polyolefins, particularly polypropylene which includes high molecular weight species. High melt strength also leads to difficulty in forcing the molten resin through a small fiber-forming orifice. Within that restriction, the high molecular weight molecules will cause significant drag and diminish flow. Those same molecules will also cause significant die swelling of the polymer fibril upon its exit from the fiber-forming orifice due to their inherent tendency toward elastic response with recovery of their conformational bulk. It is this same fraction of high molecular weight molecules which will cause the molten polypropylene to have significantly increased melt strength over what should be expected at the nominal molecular weight. The net effect is that, again, the high molecular weight fraction will require higher melt temperatures and higher energy input into the machinery, which will create higher wear rates caused by higher pressures needed to force the material through the fiber-forming orifices. The necessarily high temperatures and pressures will also shorten the life of the fiber-forming die or spinerette.

Along with these processing difficulties for fiber manufacturers, the fibers resulting from traditionally produced polypropylene will tend to be thick, due to the melt strength of the molten resin. Such fibers will lead to formation of fairly coarse, boardy feeling fabrics which will not be stretchy or forgiving at points of flexion if worn as a garment. This coarseness and lack of "give" in such poly-alpha-olefin fabrics limit their use in garments and other applications where a pleasant feel or "hand" is desirable.

It is the stiffness of fibers and boardiness of their resulting fabrics produced from the traditionally catalyzed polyolefins, particularly polypropylene, which has led to some complicated post-formation processes. For example, Kobayoshi et al., describe, in U.S. Pat. No. 5,078,935 a mechanical creping step which puts crimps in the fibers and fabric after fabric formation to effectively make the fabric somewhat stretchy and less restrictive when used as a garment.

Significant advances were made in the 1970's in the field of post-reactor treatment of polypropylene to enhance processability. Most of these post-formation or post-reactor processes involve some sort of molecular chain scission of the polymer molecules. Such scission or molecular cleaving is normally accomplished through the treatment of polyolefins, particularly, polypropylene, with heat and oxygen, or a source of free radicals such as organic peroxides. For background purposes, some of these techniques are described in U.S. Pat. Nos. 3,608,001; 3,563,972; 3,862,265; and 3,898,209.

Timmons et. al. teach, in U.S. Pat. No. 5,188,885, formation of nonwoven fabric laminates using polypropylene. As described, the isotactic polypropylene which is used by Timmons is of low crystallinity, or low isotacticity. Further, Timmons describes use of Exxon Polymer Grades 3125 and 3214 for their formation of fabrics. It is clearly stated that the 3214 grade has been peroxide treated to reduce the melt viscosity by molecular scission. While it is not stated, the fact that the 3125 grade is a peroxide treated grade of polypropylene must be recognized. Post-reactor viscosity reduced polypropylene was used for half of the fabric laminates. The other half used an ethylene copolymer, not a poly-alpha-olefin.

Such post-reactor processing has the potential to cause molecular cleaving or general degradation of all polymer molecule chains within the polymer, thereby dramatically reducing the nominal molecular weight and the molecular weight distribution of the polymer. In light of the fact that the larger polyolefin molecules have more potential sites for oxidative degradation or scission, the fraction of high molecular weight species will be significantly reduced upon the exposure of the polymer resin to such post-reactor treatment.

The post-reactor treatment involving oxidative scission, as discussed earlier, has served a useful purpose for fiber makers. Such scission offers similar benefits to producers of fibers and fibrous products including those made by melt-spinning, melt blowing or spunbonding processes as it would for most other end-use product producers. These include reduced overall viscosity, shifted molecular weight distribution, reduced nominal molecular weight, and significantly reduced fractions of high molecular weight species.

Coupled with the benefits which are derived from the post-reactor oxidative scission treatment of polypropylene, however, are some significant drawbacks. While such a treatment of polypropylene does indeed significantly reduce the fraction of high molecular weight species which are present, it also dramatically increases the fraction of low molecular weight species in the polymer. The presence of these low molecular weight species causes various difficulties for the fiber manufacturer. Since the lower molecular weight species tend to be more mobile they also tend to become airborne or volatile during melt processing.

This volatility causes difficulty such as an apparent smoking from the material at high temperature when it is not contained, as when it exits a spinning die. Coupled with that volatility, there may be unpleasant vapor and odors which may raise concerns for people involved in the processing and production of fibers. That same volatility of the low molecular weight fraction will tend to lead to a blooming or surface imperfection on the finished fibers after they are drawn due to the pitting and cracking which may be caused as the low molecular weight species volatilize. An additional maintenance headache is created by the recondensation of these low molecular weight species within ventilation equipment when they come back down to the melting point after having been volatilized from the melt as it exits the forming device or die.

Within fiber production itself, other problems can occur due to the increased fraction of low molecular weight species. This includes significant die drooling or drip which is attributable to separation of low molecular weight species at the die outlet. Reduced viscosity is caused by the low molecular weight species. Along with drooling, there is also a tendency for the low molecular weight species to collect at the exit of an orifice or a die. During high speed processing this collected scale may break off from the die or spinnerette face becoming included at the surface of the fiber which is being formed. This "slub" becomes an imperfection in the fiber which will probably cause a break in the line. When such slubbing occurs, it is likely that the line must be shut down. The die will require either changing or cleaning prior to re-starting production.

Essentially, to gain advantage in processing these polyolefins, the end-use producer accepts the detriments caused by the presence of increased low molecular weight fractions when the polymer producer provides product which has been treated by the post-reactor oxidative scission process. In addition to creating some other handling difficulties for the producer of fibers or fibrous products, the polyolefin producer must add another fairly expensive step to the production process. This not only increases costs but also complicates the process of polyolefin resin production for the polymer producer.

In light of the complications caused for both the polymer producer and the end user of the polyolefin it would be useful and valuable to produce isotactic polyolefins as reactor-grade materials having a narrow molecular weight distribution yet still having the nominal molecular weight of the post-reactor oxidatively degraded products. Aside from removing an expensive and process-complicating step from the polymer production process, this would lead to numerous benefits for the end user, particularly the polyolefin fiber producer.

Of particular value to the fiber producer would be reduction or elimination of the smoking and odor problems, ventilation fouling, and surface blooming on finished fibers. Additionally, a polyolefin product having 1) a centered narrow molecular weight distribution, centered around the nominal molecular weight, coupled with 2) the handling characteristics of the oxidatively degraded polyolefins would reduce such processing problems including drooling and slubbing which would thereby enhance not only the productivity of the fiber producer's equipment but also product quality.

Coupled with the previously mentioned benefits, the fiber manufacturer would have an opportunity to lower the melt strength of the polymer even further than possible with oxidative degradation, thereby allowing reduced diameter fibers to be produced with less die swelling than otherwise might be experienced with polypropylene containing a significant fraction of molecules having higher molecular weight than the nominal molecular weight. Such a polymer product would yield benefits to both the polymer producer by eliminating the need for an expensive and complicated post-reactor process step and the fiber manufacturer by offering the potential for higher rates of production of finer fibers.

Kloos teaches, in "Dependence of Structure and Property of Melt Spun Polypropylene Fibers on Molecular Weight Distribution" published, at pages 6/1–10, by The Plastics and Rubber Institute's *Fourth International Conference on Polypropylene Fibres and Textiles*, a conference occuring in September 1987, that spinning of polypropylene improves with degradation of the polymer by peroxide. These findings were significant and led to the determination of a value, to which fiber and spinning characteristics were correlated, termed the "Degradation Ratio".

Branchesi and Balbi teach, in "Mechanical and Structural Properties of As-Spun Polypropylene Filaments in Relation to Resin Rheology" published, at pages 27/1–9, by the Plastics and Rubber Institute's *International Conference*, which occurred in November 1989, that degraded or "controlled rheology" polymers find use in high spinning speed operations.

Amos and Goldin reported, in "Creating Higher Performance Fibers With a Novel Additive Concentrate" published in *International Fiber Journal*, Oct. 19, 1993 pages 88–96, other additives improve fibers made from "visbroken" polymers or controlled rheology polymers. These reseachers accomplished their visbreaking, or reduction in melt viscosity, through the addition of liquid or low melting fractions added to the polyolefin resin from which fibers are to be made. This apparently provides a low molecular fraction which appears to not only improve the fiber making process but also appears to provide fiber webs of greater filtration efficiency than typically peroxide treated resins.

Canich in U.S. Pat. No. 5,026,798 teaches that resins produced by a monocyclopentadienyl-hereatom transition metal complex catalyst system can be used to make a variety of products including films and fibers. The polymers so produced apparently fall within the broad MWD range of somewhere between about 1.5 to about 15, as may be noted at Column 9, Line 53. Canich, unfortunately offers no guidance as to where, in this particular broad range of molecular weight distribution, the fibers which are so glibby mentioned may be produced economically. Further, Canich offers no direction as to the treatment of the resin for producing satisfactory fibers. Therefore, the off-hand remark regarding usefulness of that material for fiber formation is of little value in the enablement of fiber production.

SUMMARY OF THE INVENTION

It is intended that the term "reactor grade" refers to polyolefin resin whose molecular weight distribution (MWD), or polydispersity, has not been substantially altered after polymerization. It is intended that this term particularly includes polyolefin which, after polymerization; 1) has not been treated, or subjected to treatment, to substantially reduce viscosity or substantially reduce average molecular weight, or 2) has been treated, or subjected to treatment, to reduce viscosity or average molecular weight, but whose MWD has not been substantially changed. Such reactor-grade polyolefins are particularly useful for fiber, particularly cross-section or diameter fiber, formation when they are produced by single-site, especially metallocene-type, catalysis. As a point of classification, of the polyolefinic polymers useful in the practice of this invention, certainly the untreated resins are preferred. Those which have been treated, but whose MWD has not been substantially altered, are quite functional but are somewhat less preferred.

Reactor-grade non-ethylene polyolefin has been produced having a narrow molecular weight distribution centered closely around the nominal molecular weight of the polymer.

It has been discovered that novel fibers demonstrating superior characteristics to other reactor grade polypropylene material can be made from this polymer. Preferably, the polyolefin of choice will be isotactic and, more preferably, will be derived from monomers having in the range of three to ten carbons, most preferably three; polypropylene. It has been further discovered that these novel fibers can be incorporated into fabrics demonstrating exceptional characteristics. Particularly, it has been discovered that small diameter, high strength fibers, useful for incorporation into fabrics, may be made from such reactor-grade polyolefin.

Since these small diameter fibers bend more easily than typical large diameter fibers, they produce yarns and fabrics which are pleasant and soft to the touch. Such yarns and fabrics will display the unique added benefits of having higher than expected strength.

Such characteristics of the fabrics incorporating fibers made from polyolefin produced by single-site catalysis are particularly impressive when compared with other fabrics prepared in a similar manner incorporating fibers made from reactor-grade polyolefins. These fibers, and fabrics of them, can be produced in volume at high speeds without some of the processing and handling problems which are inherent in traditional reactor-grade polyolefins as well as the post-reactor oxidatively degraded polyolefins.

The fibers comprise reactor grade isotactic polypropylene wherein the polypropylene is produced by single-site catalysts, particularly by metallocene-type (MCN) catalysts including Group 15 or 16 element ligand or mono-, bis-, and tris-substituted or unsubstituted cyclopentadienyl ring transition metal compounds, any of which may be bridged or unbridged, coupled, as necessary, with an appropriate activator, cocatalyst, scavenger, or combinations thereof and has a melt flow rate (MFR) in the range of greater than zero to about 5,000, and molecular weight distribution in the range of about one to about 3.5. MFR is a characteristic well known in the art and is defined by ASTM D1238(l) and reported as grams/10 minutes or dg/min, at 230° C. The preferred molecular weight distribution, coupled with the well-tailored nominal or average molecular weight, allows these fibers to be produced without the difficulties of traditional reactor-grade or post-reactor oxidatively degraded materials which would have either a significant high molecular weight fraction or significant low molecular weight fraction of molecules respectively.

Benefit may be obtained, for the fiber producer, if the average molecular weight of the polyolefin is reduced. This may be accomplished by the oxidative degradation, or treatment of the polyolefin to accomplish molecular scission. This may be realized, along with the added benefit of shifting the MWD of the conventionally catalyzed polyolefin, by subjecting the polyolefin to post-reactor treatment with an oxidizing agent, such as for example organic or inorganic peroxides, which will cleave many of the molecules comprising the polyolefin resin. Higher polyolefins, including polypropylene which are produced by single-site metallocene-type catalysts may be subjected to a post-reactor treatment which will oxidatively sever many of the molecules yet leave the molecular weight distribution (MWD) substantially unchanged. Fibers and fabrics of those fibers which are produced from polyolefins treated in this manner, without substantially altering the MWD, are within the scope of this invention. Exemplification of such post-reactor treatment of a single-site catalyzed polyolefin resin is presented later. This feature of single-site catalyzed polyolefins, which allows lowering the average molecular weight without substantial modification of the MWD, makes these polyolefins and, of course, fibers, fabrics and garments made from them, very suitable for recycle use.

These novel fibers may be formed by any method in which fiber is formed from molten polymer including melt-spinning, spunbonding processes, and melt blowing; or by non-traditional methods including centrifugal spinning, sheet slitting, and film fibrillation.

Overall, use of these various single-site metallocene-type catalysts, whether supported or unsupported, will yield reactor grade polyolefin resin which is useful for forming fibers and, subsequently, fabrics. Such fibers may be produced by traditional melt spinning which will yield finer fibers which are individually stronger and, therefore, are able to be spun at significantly higher rates of production. Fibers may be produced and immediately incorporated into fabrics such as nonwoven fabrics including spunbonded and melt blown fabrics. These polymers, when used in a high production rate spunbonding process will generally yield smaller diameter fibers, thus presenting an overall softer fabric. The fabric will be stronger than a similar spunbonded fabric made from a traditionally catalyzed reactor-grade polyolefin, particularly in light of the fact that there are more and smaller fibers at each bond point within the fabric. Of course, fibers made by blending different polymers with the specifically detailed reactor-grade polyolefins, as well as fibers made with various additives including pigments, anti-static agents, or other modifiers are deemed to be included within the scope of this invention. Additionally it is clear that fibers produced from the reactor-grade polyolefins mixed with other materials including, traditionally catalyzed polymers, natural fibers or other polymers as well as resins produced by mixed catalysts in which one catalyst is generally considered, under most conditions, to be single-site, also fall within the scope of our invention. The fiber producer will also gain benefit through the improved processability of these polymers as described earlier.

When applied to a melt blown nonwoven fabric processes, again, the fabric maker will benefit from better processing of this resin and will be able to produce smaller and stronger fibers. This will yield stronger and softer fabric but, in specialized applications, will also yield better filtration capabilities in light of the small fiber size and higher number of regular, uniformly distributed fibers per basis weight. High numbers of fibers yield smaller inter-fiber spaces allowing greater retention of particularly small particles.

Additional benefits include the ability to make stronger, more flexible, softer fibers and fabrics, including textiles of all kinds such as knitted, woven, and nonwoven fabrics. Such characteristics will allow fiber and fabric incorporation in various membranes including those useful for filtration or osmotic exchange such as blood filtration or barrier layers, gas exchange media; single, limited-use, or full-use apparel including daily wear or athletic under and outer wear, items useful for medical or surgical applications such as gowns, caps, face masks, foot or shoe covers or booties, wraps, drapes, shirts, and pants. These small, soft fibers and their fabrics will be useful where low blood strike-through, or improved bacterial and viral filtration efficiency is beneficial.

The soft character of textiles and fabrics made with these fibers also makes them useful for personal sanitary products including diaper and incontinence protection cover stock and inner liners as well as feminine care products and reusable or disposable wipes. The small diameter of the fibers and ability to fluff them makes them useful for items such as blankets, surgical, medical, personal pads or puffs, webs, batting, or high loft fabrics. The soft and tough character of the fibers and fabrics make them useful as covers for valuable or cherished items including furniture, automobiles, and glassware, as well as delivery means for various treatments such as fabric softener sheets, lotion or perfume bearing sheets, pest-repellent, or dust attractor carrying sheets.

The toughness, strength and small diameter, which yields high surface area, of these new fibers and fabrics also makes them useful in other absorbent applications such as oil or chemical recovery or containment, particularly for spills. Toughness also contributes to their usefulness in other industrial applications including bale wrap of various kinds such as cotton or rubber wrap, housewrap as well as for unique textiles such as geotextiles useful for such things as road bed and soil stabilization.

Other useful applications include thermal insulation barriers and various filters including cigarette filters and air handling systems such as heating ventilation and air conditioning systems, as well as water purification filters, air filter face masks. Other useful application include separating water from hydrocarbon, HEPA application, and filtration for automotive air. Other useful membrane applications include battery separators, utility tarps and covers and various tenting applications.

Fabrics for many of the applications may be in single or multi-layer, conformed or laminated forms including spunbonded-melt blown-spunbonded multilayers, other fiber/fiber composites, and film/fiber laminates. The multi-layer or composite fabrics may be bonded in any of numerous ways or combinations of methods including entanglement such as needlepunch and hydroentanglement, by thermal or ultrasonic means, with adhesives, application of adhesive films or layers, solvent tackifying, and by application of radiation including electron beam, microwave, and other electromagnetic means such as use of radio frequency (RF) energy.

DETAILED DESCRIPTION OF THE INVENTION

Following are descriptions of preferred embodiments and examples which demonstrate and illustrate the invention in concrete terms. It is to be understood, however, that such descriptions and examples are not implied as, or to be read as limitations of the scope of this invention.

For the purposes of describing this invention in this specification and included claims, the terms "single-site catalyst" and "single-site catalysis" will be understood to include true single-site catalysts as well as conditions of catalysis which use single-site catalysts. Under some circumstances or conditions of polymerization, it is possible that some apparently single-site catalysts may behave in a fashion which indicates that they are other than single-sited. Such catalysts and catalysis are intended to be included in this terminology. Such single-site catalysts may include, for example, metallocenes and metallocene-type compounds (MCN) or ionic species combined with cocatalyst or activating ions, mixed metallocenes or metallocene-type materials, and mixtures, combinations, or individual selections from these.

This invention includes fiber comprising reactor-grade polyolefin which has been produced by single-site catalysis.

This invention also includes fiber and fabrics comprising reactor grade isotactic polyolefin wherein the polyolefin is produced by single-site catalysis and has a melt flow rate in the range of >0 to about 5,000 and molecular weight distribution in the range of about 1.0 to about 3.5.

Generally the preferred upper ranges of MFR dependent upon means of formation will be about 3,000, about 250, or about 150. The preferred lower ranges of MFR will generally be about 5, about 50, or about 100.

As a general practice: melt spinning MFR preferred ranges will be about 5 to about 150; spunbonding MFR preferred ranges will be about 5 to about 250; and melt blown MFR preferred ranges will be about 50 to about 3,000. Generally the pregressively preferred upper ranges for polymer MWD will be about 3.5, about 3.2, about 3, about 2.5, or about 2.2. The increasingly preferred polymer MWD lower ranges will be about 1.0, about 1.6, about 1.7 about 1.8, or about 2.0.

These fibers can be used to form fabrics comprising the fibers by traditional weaving, and knitting, as well as through nonwoven formation such as spunbonding and melt blowing processes. Fabrics made from these novel fibers, particularly when the fibers are of a comparatively small diameter, display better hand and will be more drapeable than fabrics produced of similar fibers having been made from traditionally catalyzed reactor-grade polyolefins. This is particularly the case since the fibers of this invention can be melt drawn to a finer diameter than traditionally catalyzed reactor-grade polypropylene.

While not wishing to be bound by theory, we believe that, because of the consistency of the length of the polymer chains (narrow molecular weight distribution) and the consistent tacticity distribution of the single-site catalyzed polymers, the fibers of our invention will generally be stronger, or have higher tenacity than conventional polymer when drawn to fine diameter in spite of the fact that they are drawn to a finer diameter. This means that extra strength of the fabric is gained while softness is enhanced by diminishing the fiber diameter; thereby allowing greater flexibility of the fiber, and a resulting fabric which displays enhanced drapeability and softness. Generally finer fibers, and their production processes, will benefit from the practice of this invention. Progressively prepared fiber diameters are about 400 $\mu$m, about 200 $\mu$m, about 100 $\mu$m, about 50 $\mu$m, about 20 $\mu$m, about 10 $\mu$m, about 5 $\mu$m, and about 3 $\mu$m with fiber diameters in the range of greater than about 1 $\mu$m and less than about 50 $\mu$m being preferred. The range of fiber diameters that is greater than about 3 $\mu$m and less than about 20 $\mu$m is particularly preferred. Coarser fibers will benefit some by the practice of this invention, but not to the extent by which finer fibers will benefit.

Additionally, fabrics employing such finer fibers will have significantly more fibers for a given basis weight, particularly for melt blown nonwovens. This means that such fabrics can be expected to be generally stronger while still providing small pores or spaces between fibers. This characteristic will be particularly useful in filter applications where both overall strength of the fabric and its ability to filter smaller particles will be beneficial.

In recent years several catalyst systems based upon metallocene-type chemistry have been developed. These include Welborn, EP A 129 368 which is hereby incorporated by reference and which describes use of cyclopentadienyl transition metal compounds for catalysis of olefins. Turner and Hlatky, EP A 277 003, EP A 277 004, and U.S. Pat. No. 5,153,157 which are incorporated by reference describe discrete catalyst systems based on metallocene-type chemistry but employing anionic activators. Canich, U.S. Pat. No. 5,057,475, incorporated by reference, describes olefin polymerization catalysis using modified metallocene-type catalysts wherein a monocyclopentadienyl/heteroatom transition metal compound is substituted for the earlier generations of metallocene compounds. Canich, Hlatky, and Turner describe, in WO 92/00333, also incorporated by reference, the use of ionic activators with monocyclopentadienyl/heteroatom transition metal compounds for olefin polymerization.

Specific metallocene-type catalysts useful for producing isotactic olefin polymers may be found in EP A 485 820, EP A 485 821, EP A 485 822, and EP A 485 823 by Winter et al, and U.S. Pat. Nos. 5,017,714 and 5,120,867 by Welborn. These publications are included by reference here.

Various publications describe placing catalyst systems on a supporting medium and use of the resulting supported catalysts. These include U.S. Pat. Nos. 5,006,500, 4,925, 821, 4,937,217, 4,953,397, 5,086,025, 4,912,075, and 4,937, 301, by Chang and U.S. Pat. Nos. 4,808,561, 4,897,455, 5,077,255, 5,124,418, and 4,701,432, by Welborn, all of which are here included by reference.

The following examples demonstrate the use of supported metallocene-type catalysts, for preparation of isotactic poly-alpha-olefin. Further information relating to support techniques and use of the supported catalysts may be found in U.S. Pat. No. 5,240,894 by Burkhardt.

While the catalysts used for the following examples were employed in a bulk liquid-phase polymerization process, the concepts relating to catalyst use presented here may be applied to other polymerization processes including, for example, gas phase, slurry phase and high pressure processes.

Gel Permeation Chromatography (GPC) is a liquid chromatography technique widely used to measure the molecular weight (MW) and molecular weight distributions (MWD) or polydispersity of polymers. This is a common and well-known technique. Such characteristics, as described here, have been measured using the broadly practiced techniques as described below.

Equipment and Reagents Used:
  Waters model 150C chromatograph
  Three (3) Shodex AT-80M (mixed bed) columns
  1, 2, 4-trichlorobenzene (HPLC grade) as solvent
  Sample polymer to be tested
Operating Conditions:
  Temperature: 145° C.
  Flow rate: 1 ml/min
  Run time: 60 min
  Injection vol.: 300 microliters (ul)
Sample Preparation:
  Samples are prepared by weighing 10 mg of sample into a 20 ml vial. 10 ml of trichlorobenzene (TCB) is added and the mixture is stirred at about 180° C. until all the sample is dissolved. This is generally complete in about 30 minutes. The solutions are then transferred to auto-sampler vials and placed in the 150C GPC.
Calibration
  The instrument is calibrated by using narrow MWD standards and fitting the results to a third order calibration curve. The standards are polystyrene and the MW shown are the polyethylene equivalent weights obtained by using the appropriate Mark-Houwink constants.
Data Acquisition and Evaluation
  Data are acquired and all calculations performed using Waters "Expert-Ease" software installed on a VAX 6410 computer.

EXAMPLES

CATALYST EXAMPLE

Catalyst Production (includes six step catalyst production and method of supporting on inert media)
Synthesis of rac-dimethylsilanediylbis (2-methyl-4,5-benzoindenyl)-zirconium dichloride

Diethyl methyl (2-naphthylmethyl) malonate (1)

5.15 g (224 mmol) of sodium were dissolved in 150 ml of absolute ethanol, while heating, and 37.3 ml (217 mmol) of diethyl methylmalonate were added at room temperature. A solution of 50 g (217 mmol) of 2-bromomethylnaphthalene (96% pure) in 270 ml of ethanol was slowly added dropwise at 0° C., and the mixture was heated under reflux for a further 4 to 5 hours. It was poured onto ice-water and extracted with ethyl acetate. The combined organic phases were dried with sodium sulfate and evaporated. After drying under an oil pump vacuum, the oily residue was stirred with hexane at 0° C., whereupon 55 g (81%) of the compound 1 crystallized.

Synthesis of 2-Methyl-3-naphthylpropionic acid (2)

A solution of 23.7 g (422 mmol) of potassium hydroxide in 50 ml of water was added to 33.2 g (105 mmol) of the compound 1 in 70 ml of ethanol, and the mixture was heated under reflux for 4 hours. After the solvent had been stripped off, the solid residue was taken up in ethyl acetate, water was added and the pH was brought to 1 with hydrochloric acid. The aqueous phase was extracted several times with ethyl acetate. After drying over magnesium sulfate, the combined organic phases were evaporated completely. The residue was stirred with hexane for crystallization. For decarboxylation, the beige-colored solid was heated at 175° C. until the evolution of gas had ended. 21 g (94%) of the product 2 were obtained as a beige-colored solid.

Synthesis of 2-Methyl-6, 7-benzoindan-1-one (3)

22 ml of thionyl chloride were added to 21 g (98 mmol) of the compound 2, with exclusion of moisture, and the mixture was heated under reflux for 30 minutes. Excess thionyl chloride was then distilled off. The residue was briefly freed from volatile compounds under an oil pump vacuum and then dissolved in 25 ml of methylene chloride, under Ar as an insert gas. The solution was slowly added dropwise to a suspension of 26 g (196 mmol) of aluminum trichloride in 60 ml of methylene chloride and the mixture was heated under reflux for a further 30 minutes. It was poured onto ice and extracted with methylene chloride. The combined organic phases were dried with sodium sulfate and evaporated. The dark oily residue was chromatographed on 600 g of silica gel 60. 8.6 g (45%) of the compound 3 were able to be eluted (yellowish solid) with a mobile phase mixture of hexane/ethyl acetate (9:3).

Synthesis of 2-Methyl-4, 5-benzoindene (4)

2.2 g (59.5 mmol) of sodium borohydride were added in portions to a solution of 7.8 g (39.7 mmol) of the indanone, compound 3 in 400 ml of a tetrahydrofuran/methanol mixture (2:1) at room temperature, and the mixture was stirred for 14 hours. The solution was poured onto HCL-acid ice and extracted with ether. The combined organic phases were washed several times with water and dried with sodium sulfate. The orange-colored oil which remained after the solvent had been stripped off was dissolved in 240 ml of toluene, and the solution was heated at 80° C. with 570 mg (3.15 mmol) of p-toluene-sulfonic acid for 15 minutes. It was washed several times with water at room temperature, dried with sodium sulfate and evaporated. The residue was chromatographed on 300 g of silica gel 60. 4.7 g (65%) of the indene 4 were able to be eluted (colorless oil) with a mobile phase mixture of hexane/disopropyl ether (20:1).

$^1$H-NMR spectrum (360 MHz, $CDCL_3$): 8.02 (1,d), 7.84 (1,m), 7.59 (1,d), 7.52 (1,d), 7.38–7.48 (2,m), 7.06 (1,m), 3.42 (2,s), 2.25 (3,d).

Synthesis of Dimethylbis(2-methyl-4, 5-benzoindenyl) silane (5)

10.2 ml (25.5 mmol) of a 2.5 M butyllithium solution in hexane were added to a solution of 4.6 g (25.5 mmol) of the compound 4 in 50 ml of tetrahydrofuran at room temperature, and the mixture was heated under reflux for 1 hour. The red solution was then added dropwise to a solution of 1.55 g (12 mmol) of dimethyldichlorosilane in 10 ml of tetrahydrofuran at room temperature, and the mixture was heated under reflux for 5 to 6 hours. The reaction solution was poured onto ice-water and extracted several times with ether. The combined organic phases were dried with sodium sulfate and evaporated, and the residue was dried under an oil pump vacuum. It was chromatographed on 300 g of silica gel 60. 500 mg of unreacted starting compound 4 were initially able to be eluted with a mobile phase mixture of hexane/3% ethyl acetate. The ligand system, compound 5, then followed with the same mobile phase. After the solvent had been stripped off, this ligand system was crystallized (isomers) from hexane. The yield was 1.7 g (34%, or 44% with respect to the indene, compound 4 reacted).

Synthesis of rac—Dimethylsilanediylbis (2-methyl-4,5-benzo-indenyl) zirconium dichloride (6)

4.0 ml (10.2 mmol) of a 2.5 M butyllithium solution in hexane were added to a solution of 1.7 g (4.1 mmol) of compound 5 in 20 ml of tetrahyrofuran at room temperature under Ar as an inert gas, and the mixture was stirred at room temperature for 14 hours. The residue which remained after the solvent had been stripped off was dried using an oil pump vacuum and washed with hexane. The pale brown powder obtained was dried using an oil pump vacuum at 40 to 50° C. for several hours and added to a suspension of 1.0 g (4.0 mmol) of zirconium tetrachloride in 25 ml of methylene chloride at –78° C. After the mixture had been warmed to room temperature, the solvent was stripped off and the residue was extracted with 20 ml of toluene in order to remove the meso form of the metallocene, compound 6. The residue of the toluene extract was then extracted with 40 ml of methylene chloride. The solution was concentrated to a small volume and left to crystallize at –35° C. A total of 970 mg (42%) of the ziroconcene, compound (6) were isolated in several fractions as the pure racemate.

$^1$H-NMR spectrum of the racemate (300 MHz, $CDCL_3$): 7.96 (2,m), 7.78 (2,m), 7.60 (2,d), 7.48–7.56 (4,m), 7.36 (2,d), 7.27 (2,s,b-Ind-H), 2.37 (6,s,Ind-$CH_3$), 1.36 (6,s,Si-$CH_3$). Mass spectrum: 574 $M^+$, correct disintegration, correct isotope pattern.

Supported Catalyst Preparation of rac—Dimethylsilanediylbis (2-methyl-4,5-benzo-indenyl) zirconium dichloride with alumoxane To an eight-liter vessel equipped with a cooling jacket and an efficient overhead stirrer was added methylalumoxane (30 wt %, 925 ml). With stirring, a suspension of catalyst (5.0g) in toluene (700 ml) was added under $N_2$ through a double-ended needle. After stirring for 10 minutes, dehydrated silica (Davison 948, dried at 800 degrees C., 200 g) was added to the solution over 20 minutes. The slurry was stirred for 10 minutes and then, while a vacuum was applied from the top of the vessel, a slight flow of $N_2$ was added through the bottom. The mixture was heated to 70 degrees C. as the solvent was evaporated over a 9 hour period. The dry solid was cooled to ambient temperature overnight. Isopentane (5 liters) was added to slurry the solids and the mixture cooled to 0 degrees C. Ethylene was added to the stirred mixture by a dip tube at a rate of 8.5–17 l/minute (0.03–0.06 SCF/minute) until a total of 491 liters of ethylene had been added. Agitation was stopped and the solids allowed to settle. The liquid was decanted from the solids, which were washed twice, each with 1.5 liters of isopentane. The wet solids were transferred to a dry-box under $N_2$ and filtered through a #14 mesh sieve. The fine particles were filtered off, washed with pentane (4 liters) and dried in vacuo. Yield: 326 g.

POLYMERIZATION EXAMPLES

Laboratory Scale Polymerization Data for Supported catalyst.

A sample of the catalyst of Example 1 (199 mg) slurried in hexane (2 ml) was flushed with propylene (250 ml) into a 2 liter autoclave, previously flushed with nitrogen, heated to 65 degrees C. and containing triethylaluminum (0.5 ml of a 1 M solution in hexane) and propylene (1000 ml). The reaction was run for 1 hour. The autoclave was cooled, vented and opened. Inspection of the interior of the reactor revealed it to be clean and free of fouling. The polymer product was dried in vacuo. 305 g of a free flowing, granular iPP product were recovered. $M_w$ of 273K, bulk density of 0.43 g/cc, and an average particle size of 750 $\mu$ meter.

Larger Scale Production of isotactic Polyolefin using Supported Catalyst

The polymer used in these examples was produced in a continuous, single reactor, bulk liquid phase polymerization process. The reactor was equipped with an agitator, and jacket for removing the heat of reaction. The reactor temperature was set at 65° C., and catalyst was fed to the reactor at a rate of 1.3 g catalyst/hour. Propylene was fed to the reactor at a rate of 60 kg propylene/hour. A continuous flow of hydrogen (0.75 g hydrogen/hour) was used to control the molecular weight of the product. Under these conditions, the average residence time of the catalyst in the reactor way 4.0 hours. Under these conditions the polymer was produced at a rate of 9.1 kg polymer/hour. The product had a 22 MFR (230° C./2.16 kg).

FIBER AND FABRIC FORMATION EXAMPLES

Fibers were prepared as spun, flat (non-lustre or low-lustre), partially oriented yarns (POY) by mechanical take-up of the fiber bundle from its extruded melt. This was accomplished on a fiberline assembled by J. J. Jenkins, Inc. (Stallings, N.C.). The line consists of a 5 cm (2 inch) Davis Standard Extruder (with 30:1 length/diameter ratio) and 6 cc/rev Zenith metering pump forcing molten polymer through a spinnerette plate of 72 holes of 0.6 mm and 1.2 length/diameter ratio. A metering pump rate of 10 rpm was employed which yields a through-put of 0.625 g/hole/minute.

Fibers were drawn from the 232° C. (450° F.) melt by an axially spinning unheated godet at 1000, 1500, 2000, 2500, and 3300 m/min. The fiber bundle, expressed as total denier/total filaments collected at each rate was 405/72, 270/72, 203/72, and 162/72 respectively. The fiber bundles were collected for characterization as five minute runs by Leesona winder.

The fiber bundle tenacity (g/denier) and elongation were measured by pulling to break on an Instron. Fiber testing was performed on an Instron machine, Model 1122 coupled with the Instron computer which supports the Sintech Sima (Testworks II⁻) computerized system for material testing. Instron Pneumatic Cord and Yarn Grips (Model 2714) were used for gripping the samples. A sample with 2.5 cm (1 inch) gauge and 0.1 gram preload was pulled at 500 mm/min to break. Break sensitivity was 95% drop in force.

Fibers were melt spun from a 40, 51, and 68 MFR polypropylene. These are materials which were produced by previously described metallocene-type catalysis. Fibers spun from a traditionally catalyzed polypropylene which was subjected to controlled rheology treatment (post-reactor oxidative degradation) having 33 MFR (Exxon Chemical Company, PP-3445) and a 35 MFR traditionally catalyzed polypropylene (Exxon Chemical Company PP3345) which was not subjected to post-reactor oxidative treatment will serve for comparison. The following results were obtained from tenacity and elongation testing of those fibers which were spun with take-up rates of 1000, 1500, 2000, 2500 and 3300 m/min. The results of these tests are presented below in Table I.

TABLE I

Comparison of Tenacity Values of Fibers Prepared of Metallocene-Type Catalyzed Polypropylene (MCN) with 40, 51, and 68 melt flow rate (MFR) and Controls, Traditionally Produced Reactor Grade (by Ziegler-Natta (Titaniun) Catalysis) and Post-Polymerization Degraded Polypropylene, both with 35 MFR Tenacity (g/den)

| | Test Examples | | | Control Examples | |
| --- | --- | --- | --- | --- | --- |
| Fiber Take-up Rate (m/min) | MCN 40 MFR | MCN 51 MFR | MCN 68 MFR | C/R 33 MFR | Reactor (Z–N) 35 MFR |
| 1000 | 1.94 | 1.74 | 1.53 | 2.03 | 1.28 |
| 1500 | 2.75 | | | | 1.33 |
| 2000 | 3.54 | | | | 1.51 |
| 2500 | 3.97 | 3.77 | 3.25 | 2.69 | 1.48 |
| 3300 | 4.38 | | | 3.61 | break |

Figure 1:
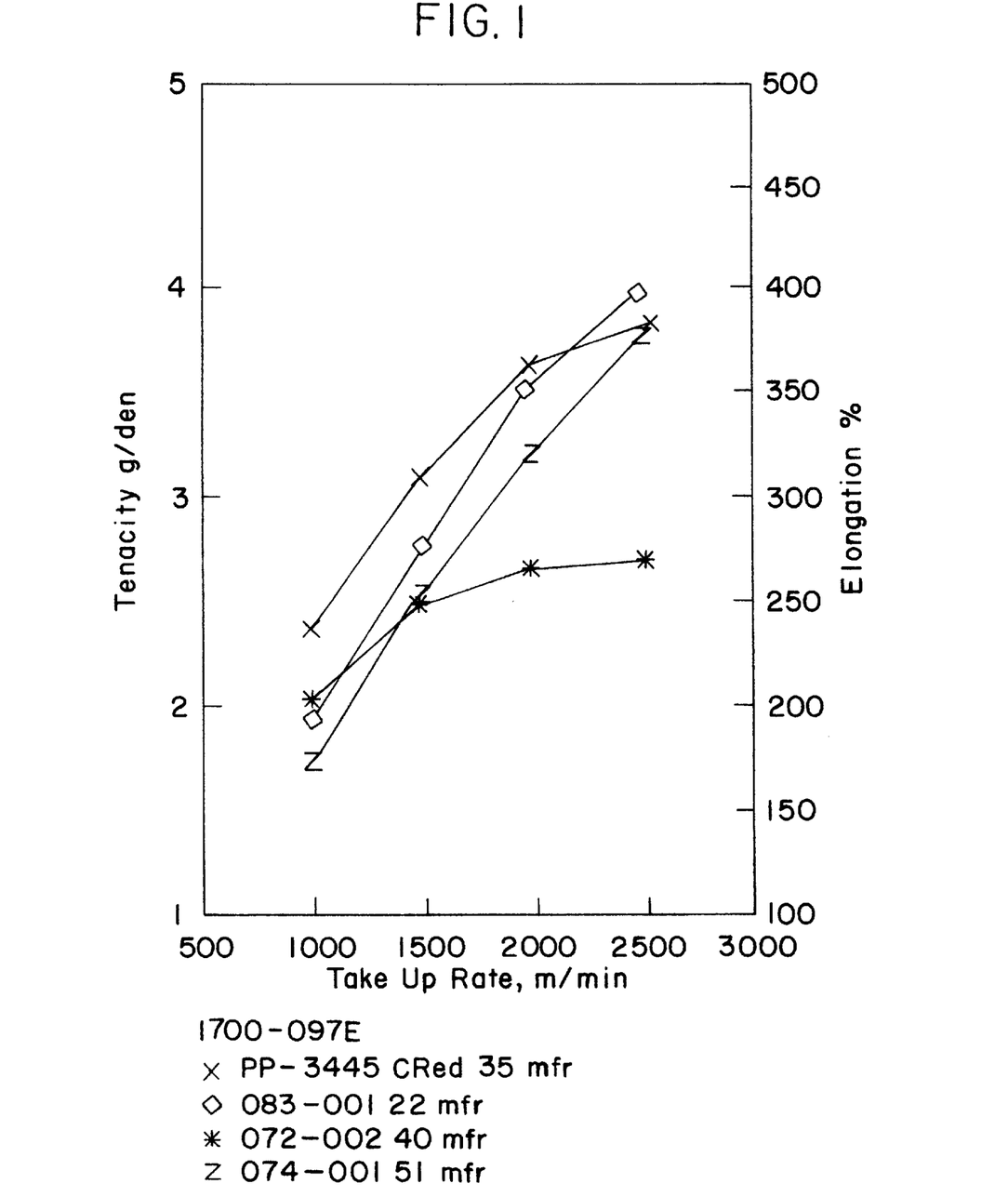
FIG. 1 is a graphic display of tenacity and elongation plotted against take-up rate comparing fibers made from commercially available polymer.

As can be seen from these results and the graphic presentation of these results, which is shown in FIG. 1, it is apparent that the fibers formed of metallocene-type system catalyzed polyolefin polymer substantially out-performed the fibers made using the control material against which they were tested regarding tenacity. For fiber elongation, it is apparent that fibers of the single-site catalyzed material performed differently than those of the traditionally produced polypropylene resin. It is apparent that the test fibers, after melt spinning, will retain less elongation but form generally stronger fibers, at a given take-up rate which relates to final fiber diameter, than will the control fibers made from the conventionally catalyzed non-oxidatively degraded polypropylene. In all cases, the resins which were used as controls for comparison were obtained from Exxon Chemical Company and are generally available with various MFR's. The metallocene-type catalyzed resins were obtained as described previously.

While not wishing to be bound by theory, it is also apparent from these results that, as greater force is applied after the fiber is melt-formed, the tenacity of the single-site catalyst produced polyolefin fibers increases markedly. This is easily seen through recognition of the fact that as the take-up rate is increased, the fiber diameter decreases and a greater degree of strain is imparted to the fiber. It is apparent that the test example fibers have noticeably higher tenacities at the higher take-up rates than do either of the control examples. The tenacity for fibers of traditionally catalyzed reactor-grade polypropylene even tends to degrade as greater force is applied and cannot be formed into fibers due to fiber breakage during take-up. This is a significant advantage for a fiber producer who will gain benefit from being able to form smaller diameter, therefore softer, fibers. Remarkably these smaller fibers will also, counterintuitively, have higher tenacity. This newly discovered trait of fibers formed of reactor-grade, metallocene-type produced polymer therefore offers the ability to form smaller fibers requiring less material, which are softer due to their greater flexibility, and which are stronger, yet still may be produced at higher rates; a tremendous set of advantages for any fiber producer.

It is apparent that increased take-up rate, or generally imparting strain to the fibril during formation of the fibers, and optional subsequent fabrics, of this invention enhances the strength of the final fibers. to explore the benefits gained, understand those benefits, and standardize the measurement of those benefits, we looked at the imparting of strain in the final fibers. The melt-drawn fibers were formed by extrusion or drawing through a spinerette, or die, with holes having a diameter of 600 $\mu$m. The strongest fibers were substantially smaller in diameter than that hole diameter, or initial formation diameter. Division of the initial formation diameter by the final fiber diameter yields what we have termed as the "final draw reduction". At take-up rates of 1,000 m/min, the final fiber diameter was 29.3 $\mu$m; the initial formation diameter was 600 $\mu$m. Deriving the final draw reduction (FDR) for that fiber by dividing 600 $\mu$m by 29.3 $\mu$m yields an FDR of 20.3. Similar calculations for fiber which was wound or taken-up at 1500 and 2000 yields FDR's of 24.7 and 28.8 respectively preferably the final draw reduction is greater than about 20 and the take up rate is greater than 1500 m/min.

After viewing the tenacity test results as presented in Table I, it is apparent that the fibers produced from single-site catalyzed, reactor-grade polymers with final draw reductions greater than about 20 substantially outperformed the analogous fibers produced from traditionally catalyzed reactor-grade resins. Based on the test evaluations for tenacity it is believed that the enhanced tenacity would also be found in fibers (made from single-site catalysis produced reactor grade polyolefin) produced with take-up rates of about 500 m/min. since application of force, or imparting of strain to reduce diameter and increase tensile modulus can be accomplished by this spinning rate. The higher take-up rates of 1000, 1500, 2000, 2500, 3000, and 3300 m/min would be progressively more preferred. It is apparent, however, that application of force to gain these benefits can be accomplished through numerous means including the application of processes for fiber making and immediate fabric formation including melt-blowing and spunbonding as well as the demonstrated melt-drawing.

Spunbonding Examples

Another test was run to form fibers and create a spunbonded nonwoven fabric. This was accomplished by use of a one meter Reicofil line which is made by Reifenhauser Company. The extruder size was 7 cm (2.75 in.) with a 30:1 length:diameter ratio. There were 3719 die plate holes, each having a diameter of 0.4 mm with L/D=4/1. Table I provides general information on the polymers which were tested, processing conditions for each polymer tested, and test results of the nonwoven spunbond fabric which was produced. The spunbonding process is one which is well known in the art of fabric production. Generally, continuous fibers are extruded, laid on an endless belt, and then bonded to each other, often by a heated calendar roll. An overview of spunbonding may be obtained from Wadsworth, L. C. and Goswami, B. C., Nonwoven Fabrics: "Spunbonded and Melt Blown Processes", proceeding *Eighth Annual Nonwovens Workshop*, Jul. 30–Aug. 3, 1990, sponsored by TANDEC, University of Tennessee, Knoxville.

Three metallocene-type catalyzed polypropylene resins were tested in a spunbonding process and two control materials were also tested. The controls were 70 melt flow rate (MFR) and 35 MFR respectively. The first two single-site catalyzed resins to be tested were 68 MFR and 45 MFR respectively, in an effort to use apparently similar nominal molecular weight materials for comparative testing. The third test was to spin fibers and form nonwoven fabric of a 22 MFR single-site catalyzed polypropylene. Two tests were run; one each with a melt temperature of 210° C. (410° F.) and another with a melt temperature of 238° C. (460° F.).

These tests were run in this manner to determine differences between spunbonded fibers and fabrics formed at varying temperatures. The results of these tests including fiber diameter measurements and tensile strength in the machine direction of the final finished spunbonded fabric are presented below in Table II. It should be recognized that all fabric tested was a nominal 40 g/m² basis weight.

TABLE II

| Sample | Fiber Diameter ($\mu$m) | MD Tensile Strength, kg/cm² | (psi) |
| --- | --- | --- | --- |
| Control SP 70 MFR | 21.46 | 0.69 | (9.86) |
| SSC 68 MFR | 17.83 | 0.73 | (10.43) |
| Control SP 35 MFR | 24.46 | 0.58 | (8.24) |
| SSC 45 MFR | 19.13 | 1.05 | (14.88) |
| SSC 22 MFR, 210° C. | 21.86 | 0.66 | (9.46) |
| SSC 22 MFR, 238° C. | 17.80 | 1.07 | (15.22) |

From this set of test data it is apparent that the fabric produced from the smaller diameter fibers which were made from resin produced by single-site catalysis are consistently stronger than the control fabrics. This is particularly evident when the fibers are formed at about 240° C. Fabric producers will benefit by having the ability to prepare higher strength fabrics comprising smaller diameter fibers. Practice of our invention will allow such manufacturers to accomplish this simply through judicious choice of their polyolefin resin and without significant modification of their processes or equipment.

Melt Blown Examples

Further testing was done by preparing fibers using a melt blown process with similar materials. Melt blown technology is well known in the art of non-woven fabric production. An overview of the process may be obtained from "Melt Blown Process", *Melt Blown Technology Today*, Miller Freeman Publications, Inc., San Francisco, Calif., 1989, pgs. 7–12. This testing was accomplished using a 51 cm (20 in.) Accurate Products Melt Blown line. The extruder was a 5 cm (2 in.) Davis Standard with a 30:1 length:diameter ratio. The die nozzle had 501 die holes. The diameter of each being 0.4 mm. (0.015 in.). Die length was 15:1 and the air gap was set to 0.15 mm. (0.060 in.). The comparative traditional material was obtained from Exxon Chemical Company and specified by MFR. Each of the other tested resins were single-site catalyst produced polyolefin as earlier described.

Melt Blown Example I

Two samples of poly-alpha-olefin, specifically polypropylene polymerized with metallocene-type catalyst, were formed into melt blown fabrics as was one control of peroxide treated, conventional, titanium chloride catalyzed polypropylene (3545G, 400MFR with 750 ppm peroxide; obtained from Exxon Chemical Company). The polymer properties of the polypropylene from which the fabrics were formed and corresponding air permeability values of the fabrics are presented in Table III.

Air permeability was measured according to INDA Standard Test IST 70.0-70(R82), similar to ASTM D737-75 and FTM'S 191 Method 5450-1-1970. The measurements were made using a Permeability Testing Machine which is available from Frazier Precision Instrument Co., 210 Oakmont Ave., Gaithersburg, Md.

TABLE III

Polymer Properties and Air Permeability Values of Melt Blown Fabrics [1]

| Sample | Polymer Type [2] | MFR dg/min | Wt. Av. Mol. Wt. | Peroxide Level ppm (for oxidative degradation) | Air Permeability ($m^3/min/m^2$) | ($ft^3/min/ft^2$) |
|---|---|---|---|---|---|---|
| Control | Conventional | 995 | 70,300 | 750 | 35.66 | 117 |
| Sample I | Metallocene | 1076 | 66,400 | 0 | 17.99 | 59 |
| Sample II | Metallocene | 1470 | 61,400 | 0 | 15.86 | 52 |

[1] All fabrics were 34 $g/m^2$ (1 $oz/yd^2$) basis weight
[2] Based on catalyst type - either conventional or Metallocene based catalyst As can readily be ascertained, the fabric of Sample I has an air permeability value of 17.99 $m^3/min/m^2$ comparing favorably with the relatively open structure of the Control fabric having a value of 35.66 $m^3/min/m^2$. Although the MFR of Sample I is slightly higher, and correspondingly, its molecular weight is slightly lower than the Control polymer, the difference is too little to explain the large difference in air permeability.

Sample II has significantly higher MFR and lower molecular weight than Sample I and the Control. The fabric of Sample II has an air permeability value of 15.86 $m^3/min/m^2$, only slightly less than Sample I, certainly far below the value of the Control fabric. The improvements in air permeability of both materials of the Invention should correlate well with improved filtration efficiency and barrier properties. This indicates that more and smaller particles will be retained on filters produced by single-site catalysis (SSC).

Melt Blown Example II

Three different meltblown fabrics were made using two samples of polypropylene, one polymerized with single-site metallocene-type catalyst and a second, a control which was peroxide treated (750 ppm) conventionally catalyzed (using titanium chloride) polypropylene (400 MFR) (3545G, 400 with 750 ppm peroxide from Exxon Chemical Company). Melt blowing processing conditions for each polymer were optimized to prepare webs or mats having: 1) the highest coverage, 2) highest apparent air permeability, 3) lowest shot, and 4) the softest hand possible. "Shot" is generally described as "lint and polymer droplets" in the final fabric. The presence of shot is a defect in the fabric and its occurrence is undesirable as fabric with excessive shot is unusable.

Of the key processing variables, including air rate and air temperature, we found extrusion temperature to be the most critical variable to offset the desired final fabric properties. The polymer useful in the practice of this invention (single-site catalyzed material) formed a superior fabric at 232° C. (450° F.), while the Control required a higher temperature, 254° C. (490° F.), to make it's best fabric. As has been seen previously in the description of this invention, numerous benefits will accrue to the fiber and fabric producer including: 1) less energy expended in production, 2) longer die life, and 3) less volatilization of lower molecular weight molecules as well as other advantages.

It is known that application of a light water mist on the molten polymer stream between the die and the collector will improve fabric properties including shot (U.S. Pat. No. 3,959,42). The conventional PP control fabric properties were significantly improved by water mist application, as shown in Table IV, yet as is also shown, they remain generally inferior to the fabric produced from single-site catalyzed polymer which was prepared with water mist quench. Thus, it is demonstrated, again, that practice of this invention will yield improved fibers and fabrics while simplifying the producer's process thereby reducing costs.

TABLE IV

Qualitative Properties of Fabrics Prepared from Perozide Coated Polyprapylene Control Melt Blown and Single-Site Catalyzed Polymer.

| Fabric | Hand | Coverage | Shot |
|---|---|---|---|
| Control without Water | Medium | Medium | High |
| Control with Water | Soft | Good | Very Low |
| Invention with Water | Very Soft | Excellent | Low |

In interpreting the qualitative results of this experiment, for which it was intended to produce the best possible fabric from the best available polyolefin to test against the inventive fabric, it is useful to understand the following:

Hand is a measure of fabric softness. In this test, subjective comparison of "hand" was determined by a technician utilizing ungloved touch.

Coverage is estimated by holding the fabric before a backlighted glass and grading the fabric web uniformity and light transmitance.

Shot was determined by estimating the amount of shot across the width of the fabric held before a backlighted glass.

Table V presents more quantified data relating to the use of meltblown fabrics in filtration applications. Commercially produced PD3545G, available from Exxon Chemical Company, is granular polypropylene with peroxide coating. Its MFR is in the range of about 1100; this material is used, in Table V as a control for comparison against a popular oxidatively degraded polyene specifically produced for fiber, particularly high-speed, production. The test polymers were made by single-site catalysis as previously described.

Table V shows three comparisons. MB1 and MB2 demonstrate the fabric test results for fabric produced at commercial rates, 0.8 g/hole/min; MFR for the control and test fabric are well matched at around 1100.

MB3 and MB4 use the same polymers with matched MFR; the difference between this test and the previous test is that both polymers were run in this test at optimal, for fabric qualities, rates rather than matching production rates. The intent with this was to make the best possible control fabric to test the inventive fabric against.

The third series presented in Table V uses optional production rates and varies the MFR of the polymer being used to make the test fabric.

TABLE V

| 061- | Resin/ Mfr | GHM | Temp, ° F. | Air Perm., m³/min/ m² (ft³/ min/ft²) | Filt. Efficiency %[1] | Comments |
|---|---|---|---|---|---|---|
| MB1 | SSC 1110 | 0.8 | 450 | 20.12 (66) | 34.5 | Matched MFR at Commercial Thru-put |
| MB2 | Control 1100 | 0.8 | 450 | 35.96 (118) | 20.4 | |
| MB3 | SSC 1100 | 0.4 | 450 | 15.54 (51) | 52.2 | Matched MFR at optimum thru-put |
| MB4 | Control 1100 | 0.4 | 450 | 24.08 (79) | 22.6 | |
| MB5 | SSC 1100 | 0.4 | 400 | 32 (105) | 21.1 | Differing MFR |
| MB6 | SSC 1250 | 0.4 | 400 | 28.34 (93) | 28.5 | |
| MB7 | Control 1100 | 0.4 | 400 | 55.17 (181) | 10.1 | |

GHM = grams/hole/min
[1]Finely ground NaCl; number average = 0.1 μm; weight average = 0.5 μm As can be seen from these three tests, the inventive fabric outperforms the control in each series match. It is also interesting to note that the inventive fabric produced at the commercial rate (MB1) also outperforms the control made at optimal rate (MB4) by demonstrating lower air permeability and higher filtration efficiency (amount of material retained on filter).

A particularly interesting result is noted in the third series (MB5, MB6, and MB7) in which the polymers with different MFR are used to make the inventive fabric. As can be seen, benefit is obtained by a higher MFR. This is particularly meaningful when it is recognized that the 1250 MFR of MB6 could only be obtained by additional peroxide degradation of the commercial, traditionally catalyzed, polymer. This means that additional short-chain, low weight polymer molecules would be present. This would lead to more drooling, smoking, and low-end tail volatilization. It is readily apparent that the inventive fabric; which is softer, has more uniform fibers with more uniform distribution, and has better filter properties; is preferable to the traditional fabric which, in addition to its less effective filtration properties, would include undesirable processing disadvantages to make.

A further qualitative test of air permeability and contaminant retention was made by a volunteer willing to expose himself to toxic materials (a patent attorney whose registration number will not be provided) by smoking cigarettes through pieces of fabric held at the end of each cigarette. The volunteer noted, in this double blind test, that he was unable to "pull" on the cigarette after three puffs using the inventive fabric while entire cigarettes could be smoked through single pieces of the control (with water-mist quench) fabric. This result was consistent over multiple tests and is consistent with the measured results. This seemingly casual test vividly demonstrates the effectiveness of the inventive fabric for particulate retention and illustrates its practical value.

Alteration of MFR Without Substantial Change of MWD

As noted earlier, polymer produced by single-site catalysis can be subjected to degradation, particularly oxidative rheology control or adjustment, to reduce average molecular weight. This means that some post-reactor treatment may be applied to reduce melt viscosity and increase melt-flow without substantially altering polyolefin molecular weight distribution, or dispersity. The test examples presented in Table IV demonstrates this feature which will not be available with polymers produced by traditional catalysis. PD 3702G is a polyolefin obtained from Exxon Chemical Company. The SSC polyolefin was produced in a manner similar to those previously described and is representative of SSC-produced polyolefins of its type.

TABLE VI

| Resin | Peroxide, % | MFR, dg/min | M Weight Avg. | MWD (Mw/Mn) |
|---|---|---|---|---|
| PD3702G | None | 6.3 | 319,827 | 6.17 |
| PD3702G | 0.05 | 32.3 | 139,282 | 3.56 |
| PD3702G | 0.10 | 79.0 | 121,326 | 2.86 |
| SSC Polyolefin | None | 5.5 | 209,358 | 1.81 |
| SSC Polyolefin | 0.05 | 22.8 | 158,338 | 1.76 |
| SSC Polyolefin | 0.10 | 55.2 | 126,599 | 1.74 |

We claim:

1. A process for producing fibers, said process comprising:
   (a) forming molten reactor grade isotactic poly-alpha-olefin, wherein the poly-alpha-olefin has been produced using a single-site catalyst;
   (b) creating fiber comprising the molten poly-alpha-olefin; and
   (c) collecting the fiber such that its final draw reduction is greater than about 20.

2. The process of claim 1 wherein the fiber is drawn using pneumatic means.

3. The process of claim 1 wherein the fiber is drawn using mechanical means.

4. The process of claim 3 wherein the fiber is created using a melt spinning process.

5. The process of claim 2 wherein the fiber is created using a spunbonding process.

6. The process of claim 1 wherein the fiber is created using a meltblowing process.

7. The process of claim 1 wherein the poly-alpha-olefin is polypropylene.

8. The process of claim 1 wherein the poly-alpha-olefin has a melt flow rate in the range of from about 5 dg/min to about 250 dg/min.

9. The process of claim 1 wherein the poly-alpha-olefin has a melt flow rate in the range of from about 50 dg/min to about 3,000 dg/min.

10. The process of claim 1 wherein the poly-alpha-olefin has a molecular weight distribution in the range of from about 1.8 to about 2.5.

11. The process of claim 2 wherein the poly-alpha-olefin has a molecular weight distribution in the range of from about 1.8 to about 2.5 and a melt flow rate in the range of from about 50 dg/min to about 3,000 dg/min.

12. The process of claim 4 wherein the fibers are created using a take-up rate in the range of from 1500 m/min to 3300 m/min.

13. A process for producing fibers, said process comprising:
- a) producing molten reactor grade isotactic polypropylene having a molecular weight distribution in the range of from about 1.8 to about 2.5; and
- b) forming fibers form the molten polypropylene using a take-up rate in the range of from 1500 m/min to 3300 m/min.

14. The process of claim 13 wherein the fiber is drawn using mechanical means.

15. The process of claim 13 wherein the fiber is drawn using pneumatic means.

16. The process of claim 1 further comprising the step of creating a fabric from the fiber using a melt blowing process.

17. The process of claim 1 further comprising the step of creating a fabric from the fiber using a spun-bonding process.

18. The process of claim 1 further comprising the step of creating a fabric comprising first and second layers, the first layer having been formed in a spun-bonding process and the second layer having been formed in a melt blowing process.

19. The process of claim 1 further comprising the step of creating a fabric comprising first, second, and third layers, the first and third layers having been formed in a spun-bonding process and the second layer having been formed in a melt blowing process.

20. The process of claim 13 further comprising the step of creating a fabric from the fiber using a melt blowing process.

21. The process of claim 13 further comprising the step of creating a fabric from the fiber using a spun-bonding process.

22. The process of claim 13 further comprising the step of creating a fabric comprising first and second layers, the first layer having been formed in a spun-bonding process and the second layer having been formed in a melt blowing process.

23. The process of claim 13 further comprising the step of creating a fabric comprising first, second, and third layers, the first and third layers having been formed in a spun-bonding process and the second layer having been formed in a melt blowing process.

24. The process of claim 13 wherein the polypropylene is single-site catalyzed polypropylene and wherein the final draw reduction is greater than about 20.

25. The process of claim 13 further comprising the step of forming fabric from the fibers.

* * * * *